(12) United States Patent
Kemerer (10) Patent No.: US 7,833,449 B2
(45) Date of Patent: Nov. 16, 2010

(54) MOLDING PROCESS AND APPARATUS FOR CONTINUOUSLY FORMING HEATED THERMOPLASTIC POLYMERIC MATERIAL INTO A HOLLOW PRODUCT HAVING AT LEAST ONE EXTERNAL SURFACE WITH A VARIABLE CONFIGURATION

(76) Inventor: W. James Kemerer, 25711 Morales, Mission Viejo, CA (US) 92691

( * ) Notice: Subject to any disclaimer, the term of this patent is extended or adjusted under 35 U.S.C. 154(b) by 918 days.

(21) Appl. No.: 11/370,190

(22) Filed: Mar. 7, 2006

(65) Prior Publication Data
US 2006/0170131 A1 Aug. 3, 2006

Related U.S. Application Data

(63) Continuation-in-part of application No. 10/272,797, filed on Oct. 17, 2002, now abandoned.

(51) Int. Cl.
B29D 23/00 (2006.01)
B29B 11/10 (2006.01)
(52) U.S. Cl. ............ 264/209.3; 264/563; 264/566
(58) Field of Classification Search ........... 264/563, 264/566, 209.3
See application file for complete search history.

(56) References Cited

U.S. PATENT DOCUMENTS

| | | | |
|---|---|---|---|
| 3,214,313 A | 10/1965 | Chrisholm | |
| 3,274,313 A | 9/1966 | Harp, Jr. | |
| 3,274,315 A | 9/1966 | Kamamura | |
| 3,981,663 A | 9/1976 | Lupke | |
| 3,999,925 A | 12/1976 | De Putter | |
| 4,050,873 A | 9/1977 | Brumlik et al. | |
| 4,315,885 A | 2/1982 | Lemelson | |
| 5,018,959 A | 5/1991 | Jarvenkyla | |
| 5,244,618 A * | 9/1993 | Kemerer et al. | 264/166 |
| 5,296,188 A * | 3/1994 | Lupke | 264/508 |
| 5,330,699 A | 7/1994 | Shetler et al. | |
| 2004/0075188 A1 | 4/2004 | Kemerer | |
| 2005/0287238 A1 | 12/2005 | Taylor | |

FOREIGN PATENT DOCUMENTS

| | | |
|---|---|---|
| CA | 2034359 | 6/1995 |
| CA | 2137730 | 4/2002 |

* cited by examiner

*Primary Examiner*—Kat Wyrozebski
*Assistant Examiner*—Robert J Grun
(74) *Attorney, Agent, or Firm*—Connors & Assoc; John J. Connors (57) ABSTRACT

Continuous molding process and apparatus forms a hot melt of thermoplastic material against a mandrel disposed between revolving belt molds to make hollow product having surface patterns and textures of a variable configuration. The hot melt is delivered to the nip region of the revolving belt molds. The mandrel extends downstream of the nip region and provides resistance to the molding pressure to prevent the collapse of the hot molded product and to define the size and shape of the hollow in the formed product until it cools and sets.

3 Claims, 12 Drawing Sheets

MOLDING PROCESS AND APPARATUS FOR CONTINUOUSLY FORMING HEATED THERMOPLASTIC POLYMERIC MATERIAL INTO A HOLLOW PRODUCT HAVING AT LEAST ONE EXTERNAL SURFACE WITH A VARIABLE CONFIGURATION

RELATED APPLICATION & INCORPORATION BY REFERENCE

This application is a continuation-in-part of U.S. Ser. No. 10/272,797, entitled "MOLDING PROCESS AND APPARATUS FOR CONTINUOUSLY FORMING HEATED THERMOPLASTIC POLYMERIC MATERIAL INTO A HOLLOW PRODUCT HAVING AT LEAST ONE EXTERNAL SURFACE WITH A VARIABLE CONFIGURATION," filed Oct. 17, 2002 now abandoned. This related application is incorporated herein by reference and made a part of this application. Moreover, the inventor incorporates herein by reference any and all U.S. patents, U.S. patent applications, and other documents, hard copy or electronic, cited or referred to in this application.

DEFINITIONS

As used herein:

"plastic state temperature" means an elevated temperature of a thermoplastic material above ambient room temperature at which the material is unable to retain a free-standing shape or impression.

"memory retention temperature range" means a low range of temperatures above ambient room temperature at which a thermoplastic material will retain an impression, except for normal shrinkage during further cooling to ambient room temperature.

"glass transition temperature" means the temperature above which a transition occurs where a thermoplastic material changes from the plastic state to the memory retention state. The transition between the memory retention state and the plastic state is not sharp, but it does occur in a fairly narrow temperature range which usually is no more than about one or two degrees. The "glass transition temperature" is taken as the mean temperature in the narrow range over which this transition takes place.

"configuration" means any outline, contour, profile, pattern, texture, shape, etc.

BACKGROUND OF INVENTION

Apparatus and processes for forming thermoplastic materials into solid products having three dimensional (3-D) surface patterns and shapes are disclosed in U.S. Pat. Nos. 4,128,369; 4,290,248; 5,167,781; 5,244,618; 5,330,341; 5,458,477; 5,505,599; and 5,700,495. All the products disclosed in these foregoing patents are solid. The present invention enables continuous production from heated thermoplastic polymeric materials hollow products having attractive, three-dimensional (3-D) surface patterns and profile shapes to provide products having a unique design. The patterns may be random or repetitious.

SUMMARY OF INVENTION

This invention, with its several desirable features, is defined in the CLAIMS that follow. After reading the following section entitled "DETAILED DESCRIPTION," one skilled in the art will understand the benefits this invention provides. These benefits include, but are not limited to:

(1) minimal distortion normally resulting from a substantial differential in thickness in portions of solid products, (2) saving in material costs due to the hollow nature of the product, (3) more rapid cooling to increase rate of production of the product, (4) less degradation of the properties of the thermoplastic material that normally occurs in conventional injection molding, (5) avoidance of weld lines that occur during conventional injection molding of large parts using molds with multiple injection ports, and (6) most importantly, the continuous production of a hollow product that has at least one external surface with a variable configuration.

The molding apparatus of this invention forms thermoplastic material continuously into a hollow product having one or more external surfaces with a variable configuration. In this molding apparatus, heated thermoplastic material continuously moves along a path that extends between an inlet and an outlet along which the thermoplastic material moves. A pair of revolving belt molds are mounted opposite each other on opposed sides of the path. The belt molds have exterior mold surfaces, at least one of which corresponds to the external surface on the hollow product with a variable configuration. A nip region is formed between opposed portions of the belt molds into which the thermoplastic material is fed. The thermoplastic material is at a plastic state temperature as it moves into the nip region and while in the nip region being subjected to an elevated pressure. An elongated mandrel element has a portion extending into and through the nip region, and this mandrel element has an exterior surface that contacts the thermoplastic material flowing into the nip region. The mandrel element extends beyond the nip region and between the belt molds a predetermined distance sufficient to support the hollow product being formed until the product is self-supporting. Portions of the belt molds extend linearly downstream from the nip region and move synchronously. The material between this linear portion of the belt molds moves linearly at the same speed with the linearly extending portions of the belt molds.

Some, but not all, of the features of this invention are:

(1) The exterior surfaces of the belt molds contact and cool the heated thermoplastic material flowing into the nip region to form a solid skin defining the external surfaces of the hollow product surrounding the mandrel element, (2) The exterior surface of the mandrel element contacts, forms and cools the heated thermoplastic material flowing into the nip region to form a solid skin defining a hollow interior section of the product.

(3) The mandrel element includes a distal end portion projecting beyond the nip region in a downstream direction a predetermined distance to assist in supporting the hollow product as the product cools. This distance is at least 6 inches, and typically ranges from about 6 inches to about 24 inches.

(4) Downstream of the nip region, a pressure is applied to the thermoplastic material between the belt molds and the mandrel element which is substantially less than the pressure applied thereto in the nip region. Usually, the pressure applied to the thermoplastic material in the nip region is in excess of about 15,000 pounds per square inch (psi) and the pressure applied to the thermoplastic material between the belt molds and the mandrel element downstream of the nip region is less than about 1500 psi.

(5) There is a differential in temperature between the belt molds and mandrel element surfaces and the thermoplastic material in the nip region that is sufficiently great so that the material solidifies adequately to form a substantially self supporting product as the product emerges from the outlet of the apparatus.

(6) The exterior surface of each revolving mold belt is spaced from the mandrel portion in the nip region at a spacing from about 1/8 to about 3.50 inches.

(7) A stationary mold member at least partially encloses a proximal end of the mandrel element upstream of the nip region to provide a conduit for the heated thermoplastic material flowing into the nip region and generally defining the overall external shape of the product. This stationary mold member has a terminal end closely positioned near the nip region that is preferably tapered inwardly at an angle from about 20° to about 60°. Typically, a flow directing member upstream of the nip region directs the heated thermoplastic polymeric material through the conduit as a plurality of streams that surround the mandrel element.

(8) The mandrel element may be solid or hollow to include a longitudinal passageway therein that allows a cooling medium to flow therethrough during formation of the hollow product. This passageway is oriented longitudinal along the path that the material moves along. The passageway has an open distal end terminating downstream of the nip region and positioned so that the cooling medium flows through the open distal end into the hollow interior section of the product.

(9) The mandrel element includes a fluid feed circuit at least partially surrounding the passageway in the mandrel and a pump circulates a temperature-controlling fluid through the fluid feed circuit to cool the mandrel.

This invention also includes a process of continuously forming from a thermoplastic material a hollow product having one or more external surfaces with a variable configuration. In this process thermoplastic material at a temperature above its glass transition temperature is continuously fed into a nip region formed between a pair of revolving belt molds mounted opposite each other. The material in the nip region is subjected to an elevated pressure. The nip region has a portion of an elongated mandrel element extending into and through the nip region. The mandrel element has an exterior surface and the revolving belt molds has exterior surfaces, at least one of the exterior mold surfaces corresponds to the external surface on the hollow product with the variable configuration. The belt molds and mandrel element surfaces are maintained at a temperature below the glass transition temperature of the thermoplastic material, and these surfaces contact the material in the nip region. This reduces the material's temperature to within or below the memory retention temperature range. The material contacting the mold surfaces forms a solid skin on the external surfaces of the product, and the variable surface configuration is formed in the skin on at least one external surface of the hollow product. The material contacting the mandrel element surface forms a solid skin defining a hollow interior section of the product. These skins enable the product to be self-supporting. Preferably, the thermoplastic material flowing into the nip region is at a temperature that does not exceed its glass transition temperature by more than 300° F.

DESCRIPTION OF DRAWINGS

The preferred embodiments of this invention, illustrating all its features, will now be discussed in detail. These embodiments depict the novel and non-obvious molding apparatus and process of this invention as shown in the accompanying drawings, which are for illustrative purposes only. These drawings include the following figures (FIGS.), with like numerals indicating like parts.

DETAILED DESCRIPTION

Some Preferred Embodiments

A First Embodiment

Figure 1:
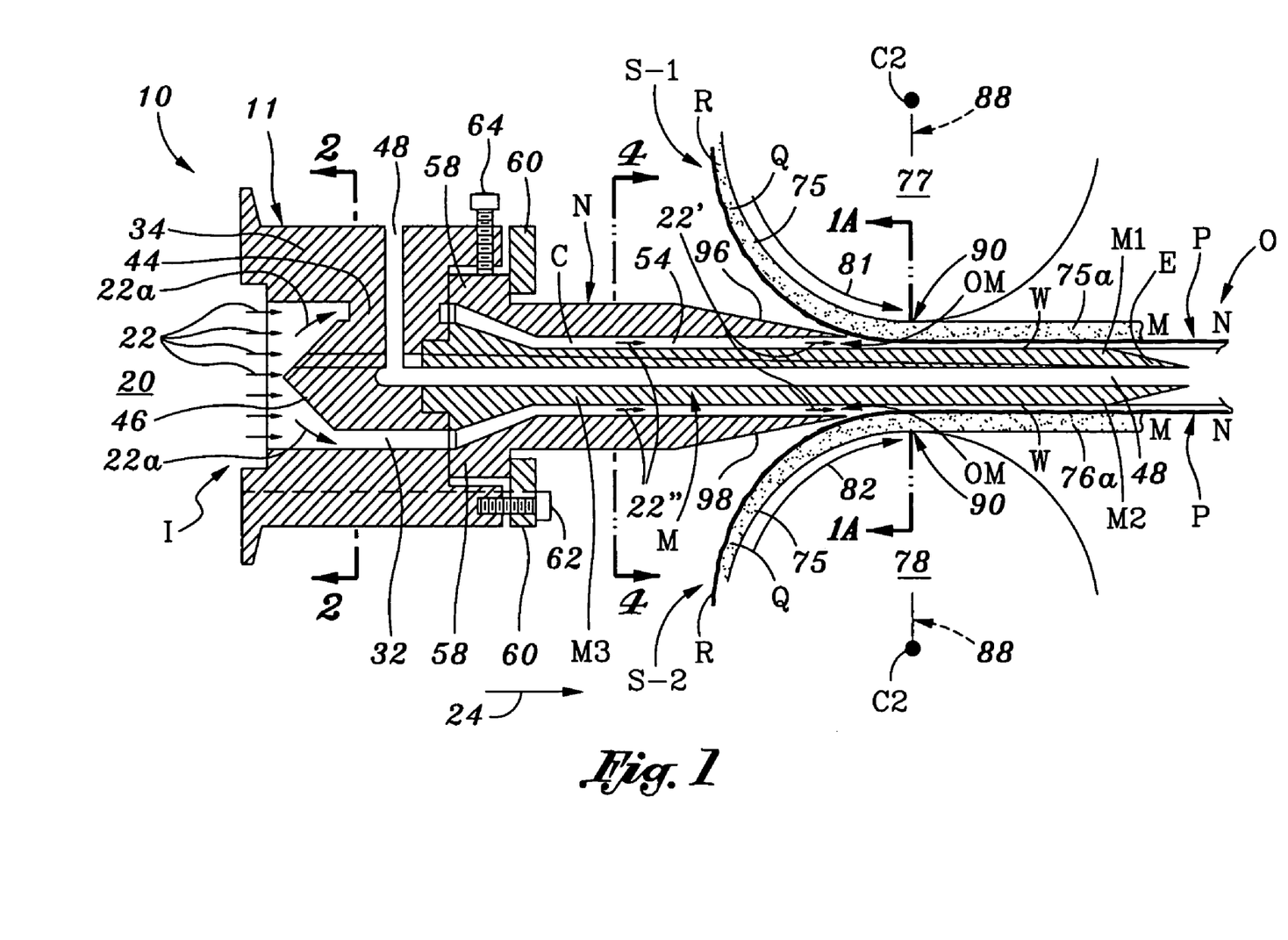
FIG. 1 is a longitudinal cross-sectional view of apparatus embodying the invention and conducting the process of this invention.
Figure 2:
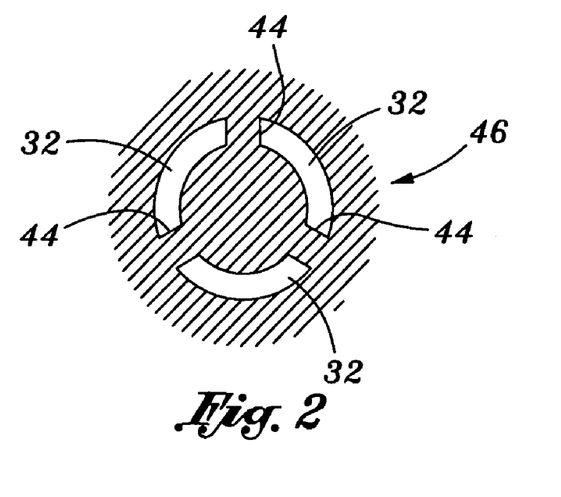
FIG. 2 is a cross-sectional view taken along the line 2-2 in FIG. 1 through a "spider" structure part of a mold body.
Figure 2A:
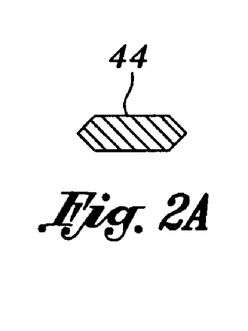
FIG. 2A is a cross-sectional view taken of a spider leg.

A first embodiment of this invention, the apparatus 10 shown in FIGS. 1 and 2, includes an extruder 11 that feeds from a mixer (not shown) heated thermoplastic polymeric material as a plastic melt 22 through a discharge nozzle 20 at an inlet I of the apparatus 10 and into a passage 32 in a die body 34. The heated thermoplastic polymeric material forming the plastic melt 22 is at a plastic state temperature and flows in the direction indicated by arrows 22a. This plastic melt 22, under pressure, flows through the apparatus 10 in a downstream direction indicated by the arrow 24. As the plastic melt 22 flows downstream through the passage 32, it is divided into three streams as it flows past a spider 46 (FIG. 2) having three radial legs 44 (only one is shown in FIG. 2A). Spiders have as many legs as suitable, usually two to eight. The plastic melt 22 splits into three separate streams 22' upon flowing past the spider 46. These streams 22' are forced under pressure to flow downstream and rejoin as continuous-forming stream of plastic melt 22 in a stationary mold member N with an open mouth OM that generally defines the overall external shape of the product P.

There are upper and lower belt carriages (not shown) straddling the flow path of the plastic melt 22. Each carriage includes a pair of aligned, revolving pulley rolls about which flexible, endless belt molds 75 and 76 are wrapped. Only the upper and lower pulley rolls 77 and 78 are shown. Each belt mold 75 and 76 comprises a web Q of material carrying an exterior layer R of silicone rubber material bonded thereto that vary in thickness from about ¼ to about 3.5 inches. Only one, or both, belt molds 75 and 76 have formed in the solid layer R of silicone rubber material a 3-D configured patterned and/or textured molding surfaces and shapes S-1 and S-2. The belt molds 75 and 76 have opposed parallel portions on opposed sides of the flow path moving in the same direction as the material flowing through the apparatus 10 and as indicated by the arrows 22'. After the product P leaves the belt molds 75 and 76, they are cooled using a blowers (not shown) while returning to the entry end. For further information regarding such revolving flexible belt molds 75 and 76 refer to any of U.S. Pat. Nos. 5,167,781; 5,224,618; 5,330,341; 5,458, 477; and 5,505,599. It is noted that the more recent patent '599 describes improved upper and lower belt molds. Also, for information about upper and lower belt carriages suitable for revolving such flexible belt molds, refer to these same above-listed five patents. Again, it is noted, the more recent patent '599 describes improved upper and lower belt carriages.

The upper pulley roll 77 is shown by arrow 81 to be rotating counter-clockwise about its axis, and lower pulley roll 78 is shown by arrow 82 to be rotating clockwise about its axis. These rolls 77 and 78 have their respective centers C1 and C2 aligned and lying in an imaginary common nip plane with the line 88 indicating an edge of the imaginary common plane. The rotational axes of upper and lower pulley rolls 77 and 78 are in parallel and each lie in the common nip plane 88. The space between the nip pulley rolls 77 and 78 along the nip plane 88 constitutes a nip region 90. The thermoplastic material passes through this nip region and is subjected to an elevated pressure. From this nip region 90 the revolving upper and lower belt molds 75 and 76 tangentially separate from their respective rotating upper and lower pulley rolls 77 and 78, each respectively extending downstream of the nip region 90 as parallel, tangential portions 75a and 76a.

Figure 1A:
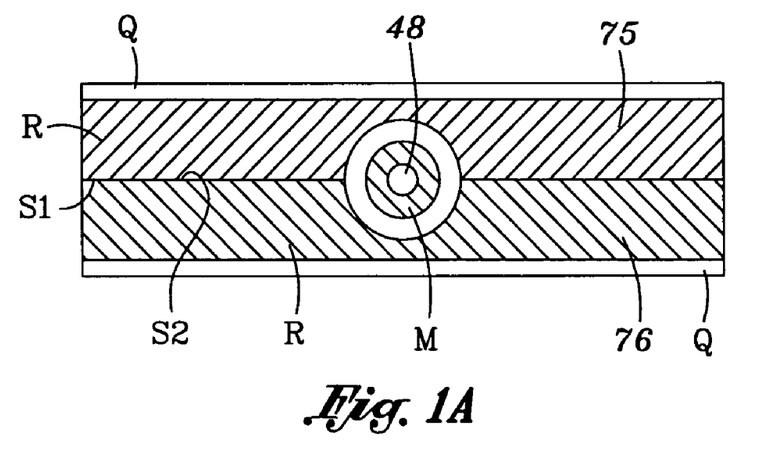
FIG. 1A is a cross-sectional view taken along the line 1A-1A in FIG. 1.

As heated thermoplastic material flows into the nip region 90, the revolving molding surfaces S-1 and S-2 produce corresponding variable surface configurations 57 on a product P being continuously formed between the upper and lower revolving flexible belt molds 75 and 76. As best depicted in FIG. 1A, the apparatus 10 is designed to form a circular hollow dowel, the product P illustrated in FIG. 12. As discussed subsequently in greater detail, other products made in accordance with this invention are illustrated in FIGS. 3, 5, 6, 6A, 7, 8, 9, 10, 11, 12, 13, 14. 17A, 17B, and 17C. All the products P made in accordance with this invention have a wall W defining cavity or cavities 56 of the product P, and this exterior of the wall has the surface 57 with a variable configuration that corresponds to the surfaces S-1 or S-2, or both, as the case may be. This product P exits the apparatus 10 at an outlet O.

A mandrel element M extends into and through the nip region 90 to form the hollow interior cavity or cavities 56 of the product P. The mandrel element M includes a portion M1 disposed in the nip region 90 and a portion M2 projecting downstream beyond the nip region 90. Surrounding a proximal end M3 of the mandrel element M upstream of the nip region 90 is the stationary mold member N. The portion M2 of the mandrel element M extends downstream beyond the nip region 90 a substantial distance. Typically, this distance is at least 6 inches, preferably from 6 inches to 24 inches. The functions of the mandrel element M are: (1) To support the exterior wall W of the product P while the belt molds 75 and 76 exert forming pressure against the external surface of the wall W in the nip region 90, with the opposing belt molds squeezing against the exterior surface of the wall W being supported by the mandrel element M. (2) To define the shape of the hollow interior cavity or cavities 56 of product P being formed and cooled. (3) To hold and set the shape of the hollow interior cavity or cavities 56 of the product P being formed. The surfaces S-1 and S-2 at the nip region 90 are each spaced from about ⅛ to about 3.50 inches away from the surface of the mandrel portion M1. This spacing determines the thickness of the wall W of the product P.

The proximal end M3 of the mandrel element M and the stationary mold member N are spaced apart to form between them a conduit C for the plastic melt 22. This conduit C feeds the plastic melt 22 into the nip region 90 over and around the mandrel element M as a single, generally-tubular stream of plastic melt. This stationary mold member N has a peripheral flange 58 secured to die body 34 by a retainer 60 removably fastened by machine screws 62 engaged in threaded bore holes in the die body. The position of the mold member N relative to the mandrel M can be adjusted slightly by loosening the retainer screws 62 and by adjusting an encircling array of outer-die-positioning machine screws 64 (only two are seen) which are threaded through bore holes in the die body 34. The die body 34, mandrel element M, and stationary mold member N preferably are machined from tool steel. The stationary mold member N has the surfaces 96 and 98 of its distal end tapered as shown in FIG. 1. These tapered surfaces 96 and 98 are upstream of the nip region 90, fit as closely as reasonably possible next to the nip region. The open mouth of the mold member N is contoured to match closely the overall general shape of the exterior of the product P.

The mandrel element M may include at least one internal air passageway 48 for feeding air at a suitable pressure and temperature into the hollow interior cavity or cavities 56 of the product P. For example, the air pressure may range from about slightly above atmospheric to about 100 psi and its temperature may range from about ambient to about 40° F. This pressurized and cooled air cools the product P more rapidly than if not used, assisting in forming a solid skin defining the cavity or cavities 56 in the product. The parallel, tangential portions of the belt molds 75a and 76a downstream of the nip region 90 cool the exterior surface of the product P, assisting in forming a solid skin on the exterior surface 57 of the product P. The desired variable configuration in this exterior surface 57 is molded into this exterior skin. Both the exterior and interior solid skins are very thin and may be from about 0.10 to about 0.25 inch thick. Nevertheless, these thin skins tend to prevent collapse of the product wall W after passing the downstream end E of the mandrel element M.

In the process of this invention, pressure applied to the thermoplastic material in the nip region 90 usually exceeds 15,000 psi and normally are from 15,000 to 30,000 psi. These pressures are applied uniformly to the limited amount of material in nip region 90, avoiding residual stresses in a product P being produced. Preferably, the plastic melt 22 has been heated to a temperature level moderately above the thermoplastic material's glass transition temperature, but typically no more than about 300° F. above this glass transition temperature. Ordinarily, the plastic melt 22 is at the lowest practicable moderate temperature level above the thermoplastic material's glass transition temperature. This moderate temperature level is considerably below temperatures ordinarily required when heated thermoplastic polymer material is being fed under pressure into a conventional stationary injection mold. Thus, thermal degradation of the plastic melt 22 is kept to a minimum by virtue of being at a temperature considerably below temperatures usually required for assuring completely filling of a conventional injection mold using usual injection pressures.

As the thermoplastic material flows into the nip region 90 at this moderate temperature above the glass transition temperature of the material, the exterior surfaces S1 and S2 of the belt molds 75 and 76 contact and cool the thermoplastic material to a temperature below the glass transition temperature. Because at least one of these surfaces S1 or S2 has an exterior mold surface that corresponds to the external surface on the hollow product with a variable configuration, there is formed in the external skin being formed the desired variable surface configuration of the product P. The exterior surface of the mandrel element M simultaneously contacts the heated thermoplastic material flowing into the nip region 90 to reduce the temperature thereof below the below the glass transition temperature of the material. Thus, the solid skin defining the hollow interior section of the product P, i. e. the cavity or cavities 56 is formed. The distance the portion M2 of the mandrel element M extends beyond the nip region 90 is sufficient to support the hollow product P being formed until the product is self-supporting. Consequently, although the entire plastic melt 22 forming the product P may not be cooled to a temperature below its glass transition temperature, at least the surfaces of the product P are cooled sufficiently below the material's glass transition temperature so the product P being formed holds its shape after passing the downstream end E of the mandrel element M.

Examples of Hollow Product

Figure 3:
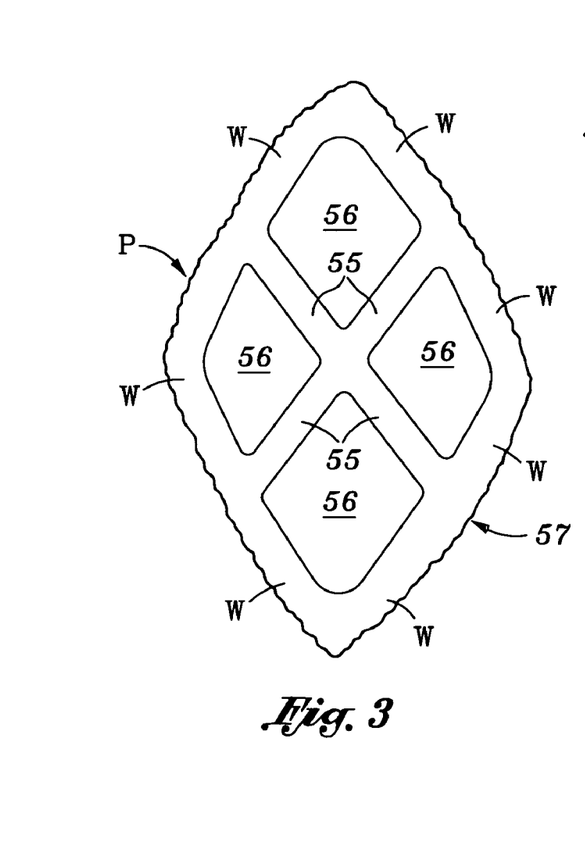
FIG. 3 is an end elevational view of a hollow rail product made using this invention.
Figure 4:
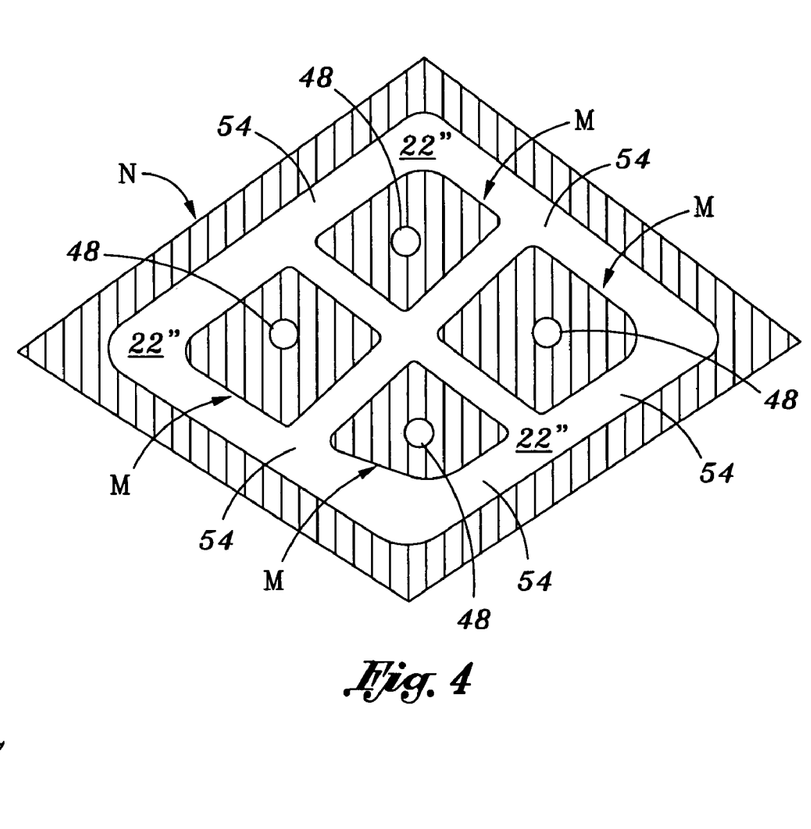
FIG. 4 is a cross-sectional view of a mandrel for producing the hollow rail shown in section in FIG. 3.

FIG. 3 shows a hollow rail product of the type which may be used in a split-rail fence. Within the hollow interior are shown two stiffening ribs extending transversely across the hollow interior in a generally X-shape configuration. FIG. 4 shows a mandrel structure for producing the hollow rail shown in section in FIG. 3.

Figure 5:
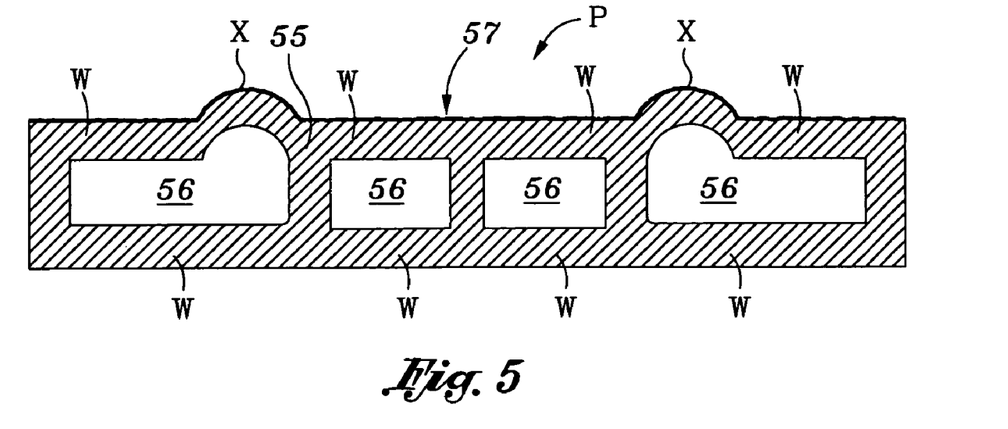
FIG. 5 is a cross-sectional view of a hollow fence rail with a raised waffle pattern made using this invention.

FIG. 5 shows a typical product P being formed by the plastic melt 22, for example, as a hollow fence rail with a raised waffle pattern. This rail has attractive exterior random 3-D configuration with patterned surfaces 57, which simulate rough wood surfaces. Its hollow interior contains bracing stiffening ribs 55 extending transversely across the hollow interior cavity 56 for stiffening and supporting the walls W of the hollow fence rail product P. The upper surface is textured like wood grain and with a raised waffle pattern X for providing traction under people's feet. For example, this deck plank may have an over-all width of about ten inches and its stiffening ribs 55 extend vertically across its hollow cavity 56.

Figure 6:
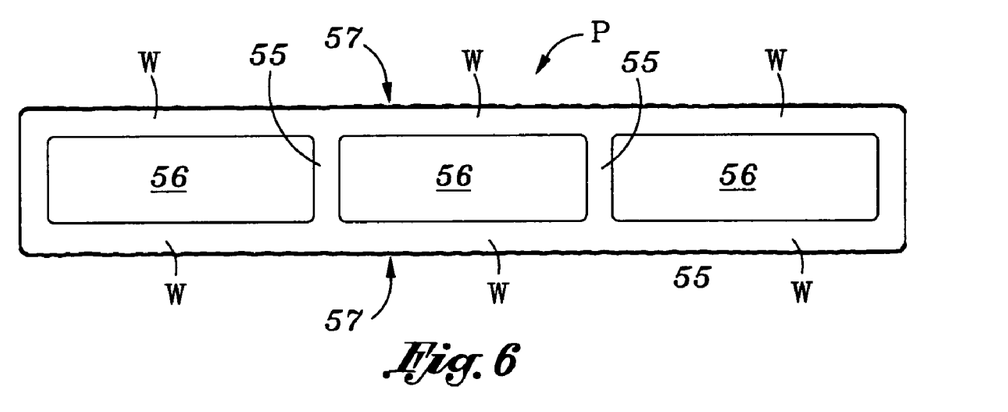
FIG. 6 is an end elevational view of a hollow plank made using this invention.
Figure 6A:
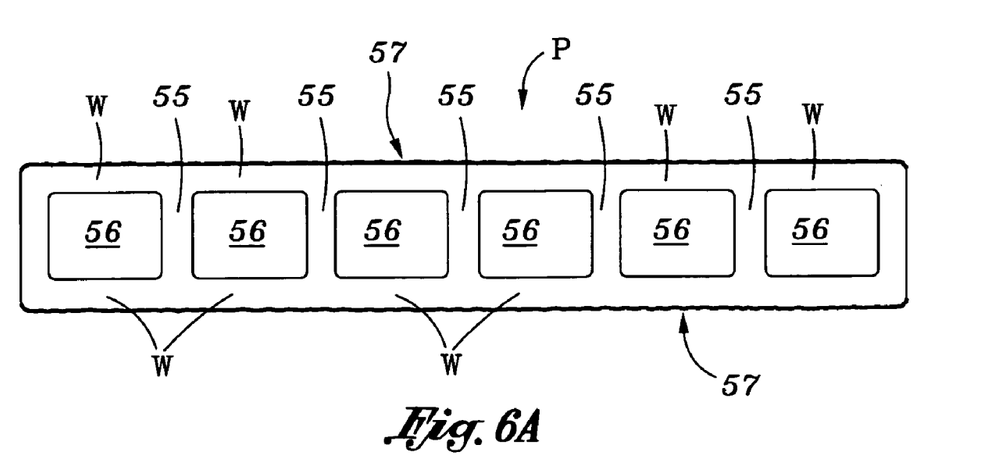
FIG. 6A is an end elevational view of another hollow plank made using this invention and having a different cross-section than the plank shown in FIG. 6.

FIG. 6 shows a hollow plank made using this invention, and FIG. 6A shows another hollow plank made using this invention and having a different cross-section than the plank shown in FIG. 6. The hollow plank shown in FIG. 6 has two stiffening ribs 55 between its upper and lower walls W to form three hollow interior cavities 56. This product has two opposed surfaces 57 textured with attractive wood-grain patterns. The hollow plank shown in FIG. 6A has an overall width of about twelve inches and has five stiffening ribs 55 extending between its upper and lower walls W to form six hollow interior cavities 56.

Figure 7:
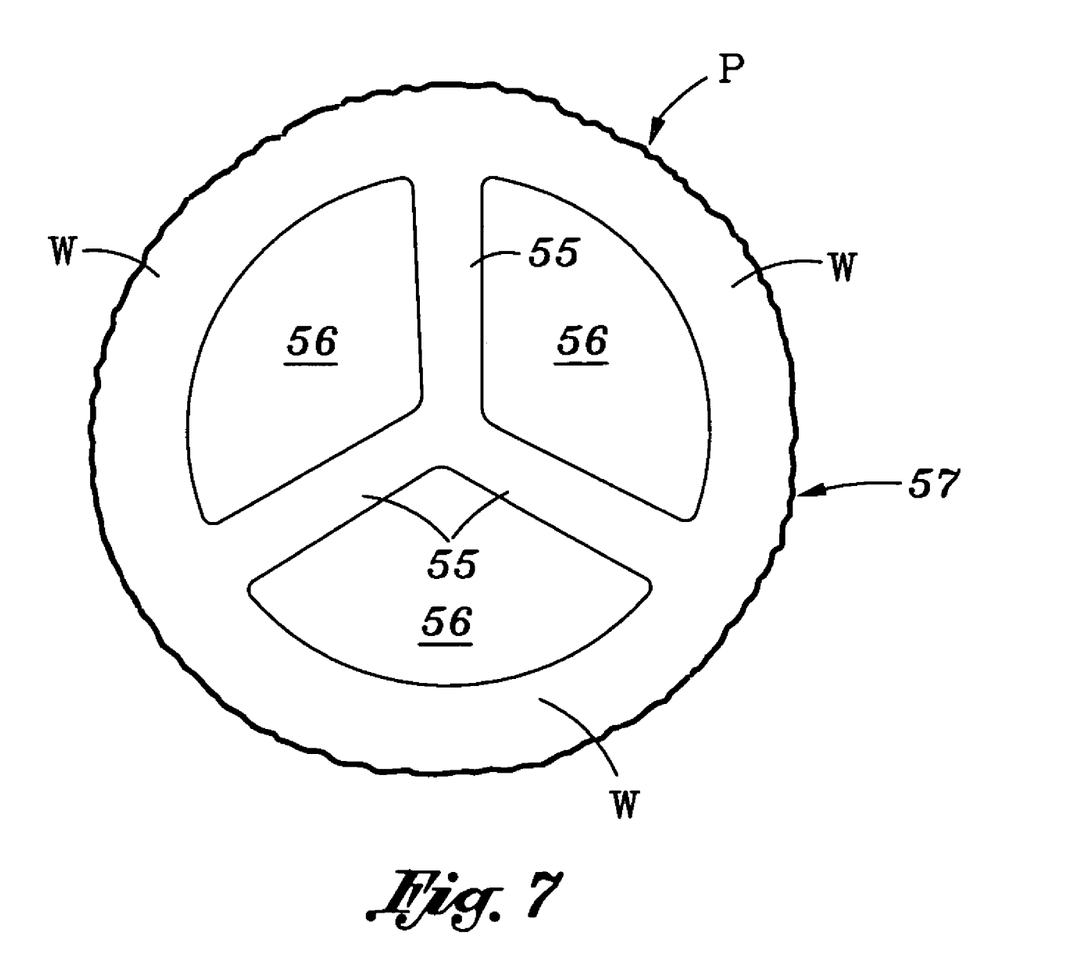
FIG. 7 is an end elevational view of round hollow post or pole made using this invention.

FIG. 7 shows a round hollow post or pole having an attractive wood-grain textured surface, for example being suitable for use as a flag pole or a porch-roof post or post for a railing and the like. A Y-configuration of three stiffening ribs 55 meet at the central axis of this hollow product P.

Figure 8:
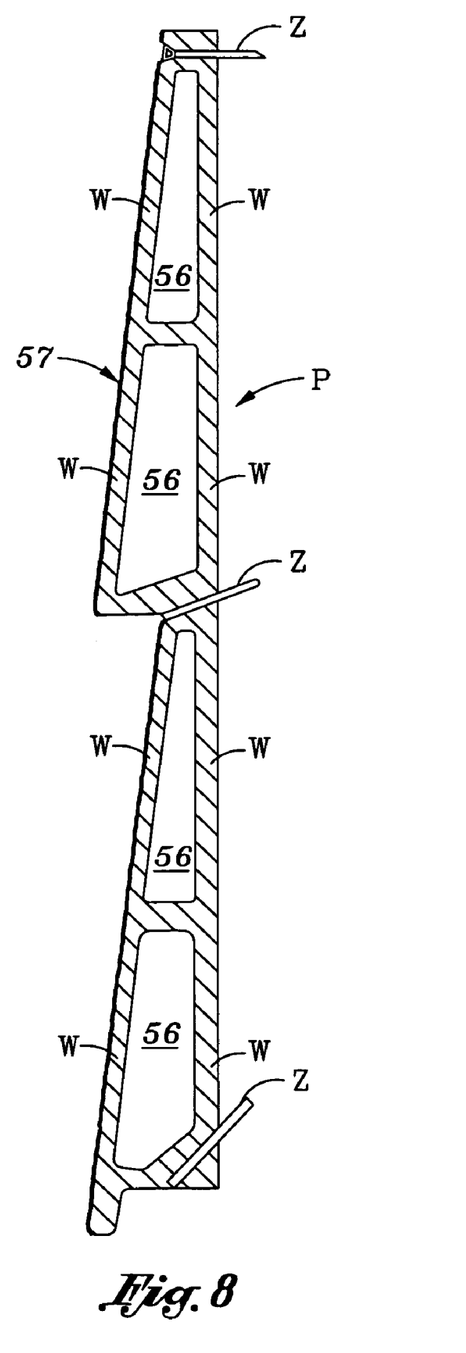
FIG. 8 is a vertical cross-sectional view of a hollow double siding panel made using this invention.

FIG. 8 shows a vertical hollow double six-inch siding panel, including a pair of simulated boards or panels having attractive, textured wood-grain patterns on its surface 57. A lower protruding lip 1 of the upper panel is positioned for overlapping an adjacent lower panel. Three nails 2 show how this panel product P is fastened to sheathing on a building.

Figure 9:
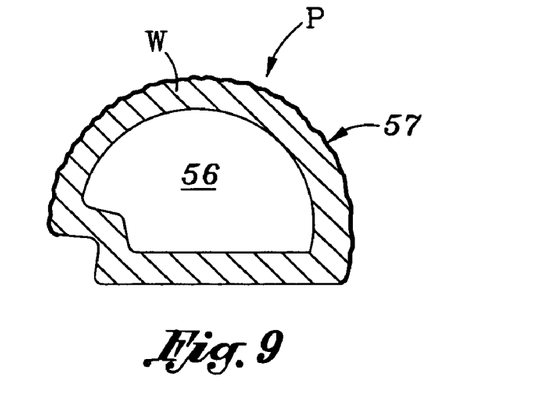
FIG. 9 is a cross-sectional view of a semi-circular like hollow dowel made using this invention.
Figure 10:
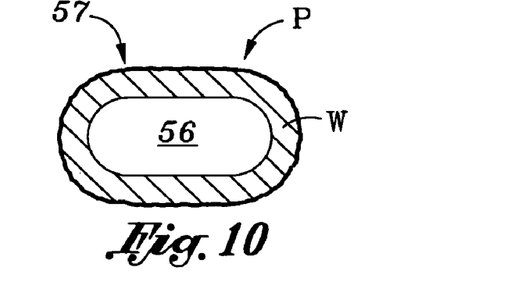
FIG. 10 is a cross-sectional view of an oval like hollow dowel made using this invention.
Figure 11:
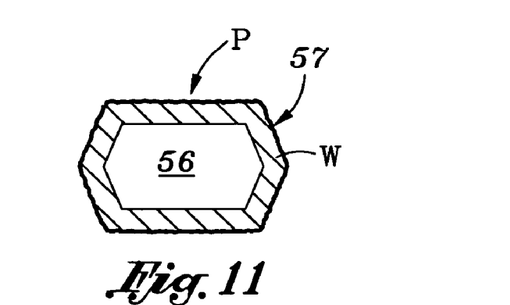
FIG. 11 is a cross-sectional view of a hexagonal like hollow dowel made using this invention.
Figure 12:
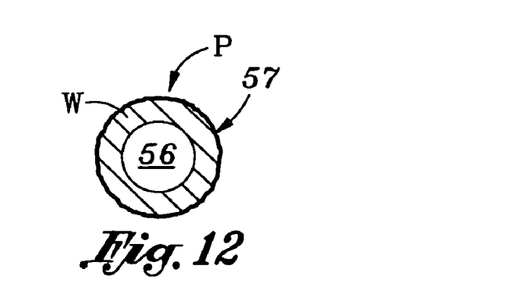
FIG. 12 is a cross-sectional view of a circular hollow dowel made using this invention.
Figure 13:
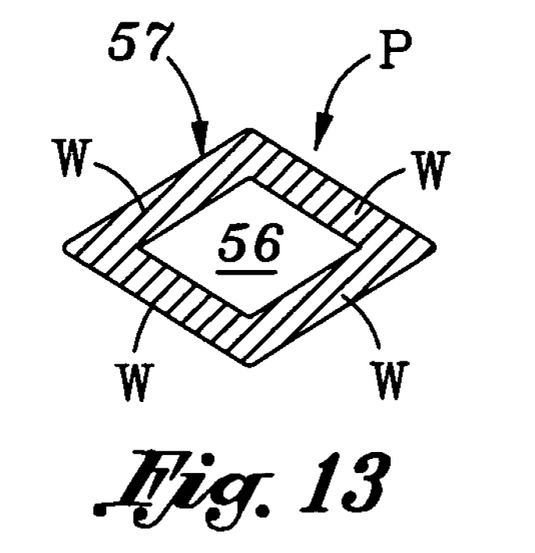
FIG. 13 is a cross-sectional view of a diamond like hollow dowel made using this invention.
Figure 14:
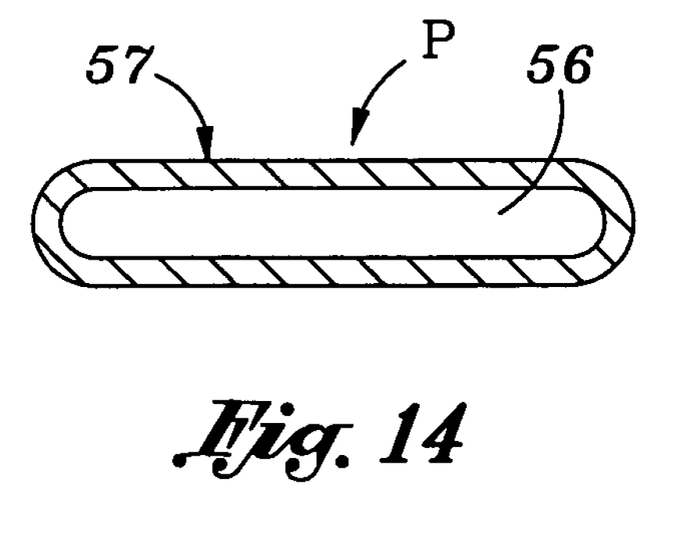
FIG. 14 is a cross-sectional view of a flatten hollow dowel made using this invention.

FIGS. 9 through 14 depict several other alternate hollow products P with surfaces 57 having a variable configuration, where FIG. 9 illustrates a semi-circular like hollow dowel product P, FIG. 10 illustrates an oval like hollow dowel product P, FIG. 11 illustrates a hexagonal like hollow dowel product P, FIG. 12 illustrates a circular hollow dowel product P, FIG. 13 illustrates a diamond like hollow dowel product P, and FIG. 14 illustrates a flatten hollow dowel product P.

A Second Embodiment

Figure 15:
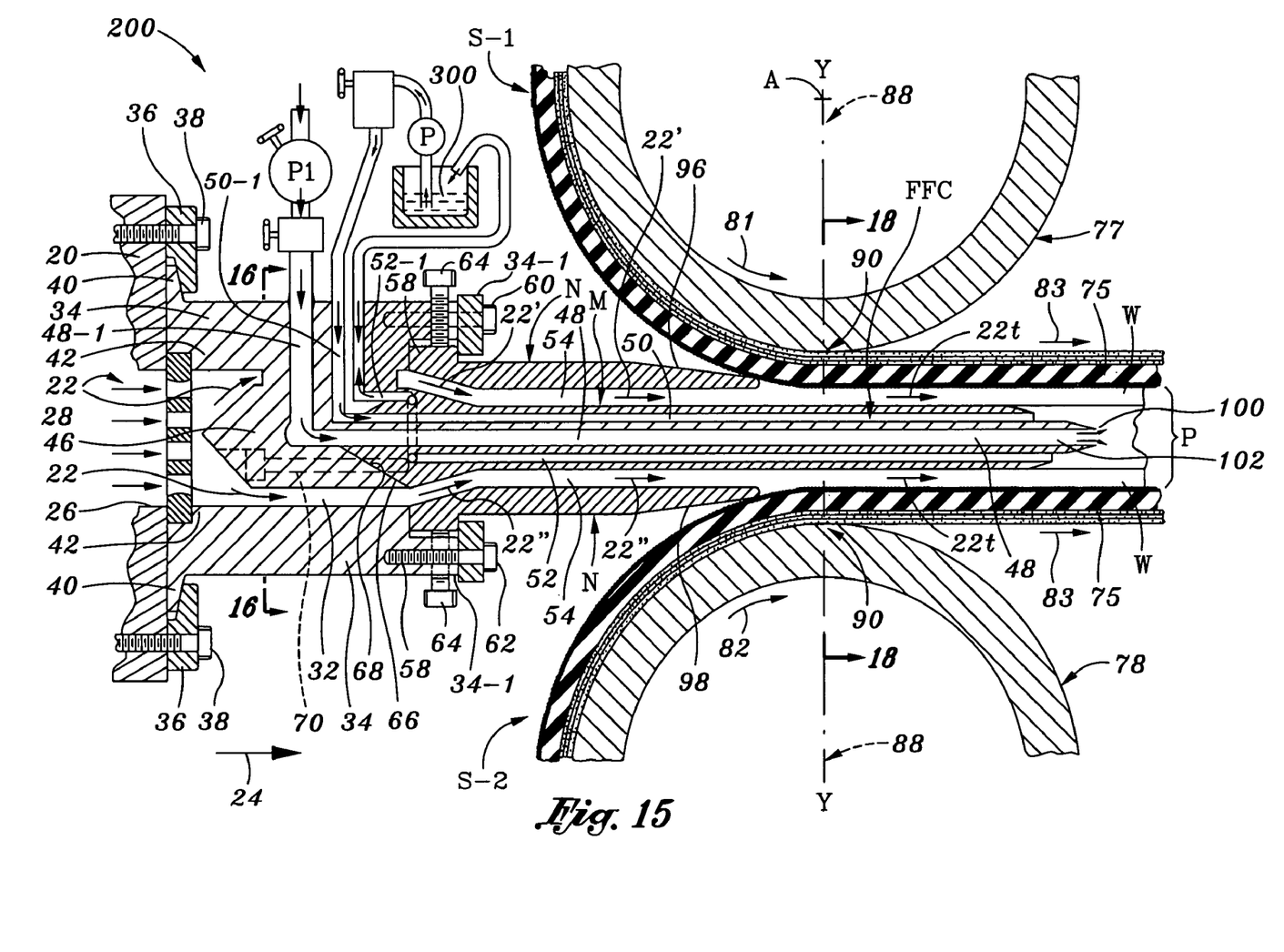
FIG. 15 is a longitudinal cross-sectional view taken along the line 15-15 in FIG. 18 of a second embodiment of the apparatus of this invention conducting the process of this invention. A portion of the plane passing through the mandrel M in FIG. 18 is diverted for providing clearer illustration of the mandrel structure.
Figure 16:
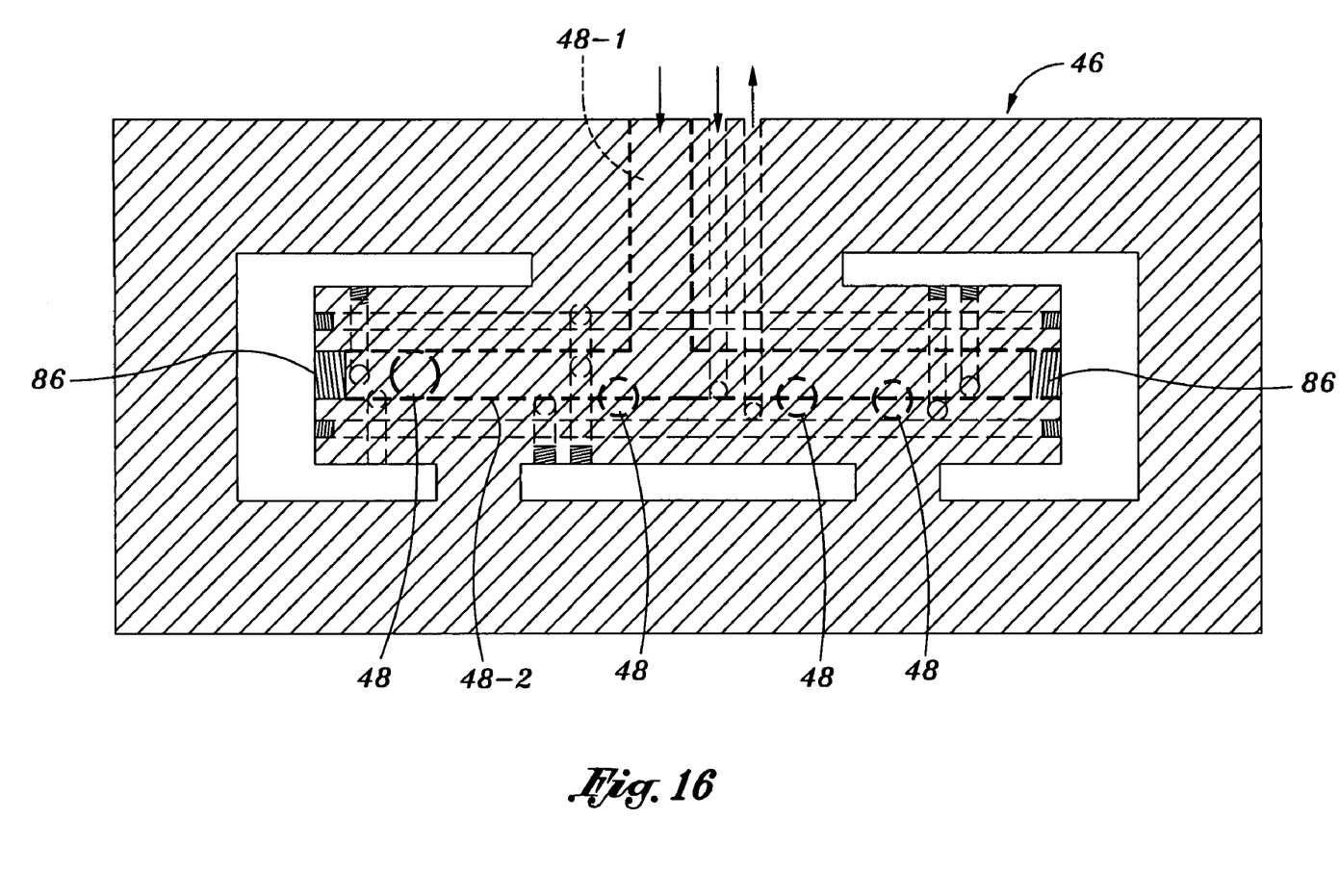
FIG. 16 is a cross-sectional view taken along line 16-16 of FIG. 15 of an alternate, more complex spider structure than the one shown in FIG. 2.
Figure 17A:
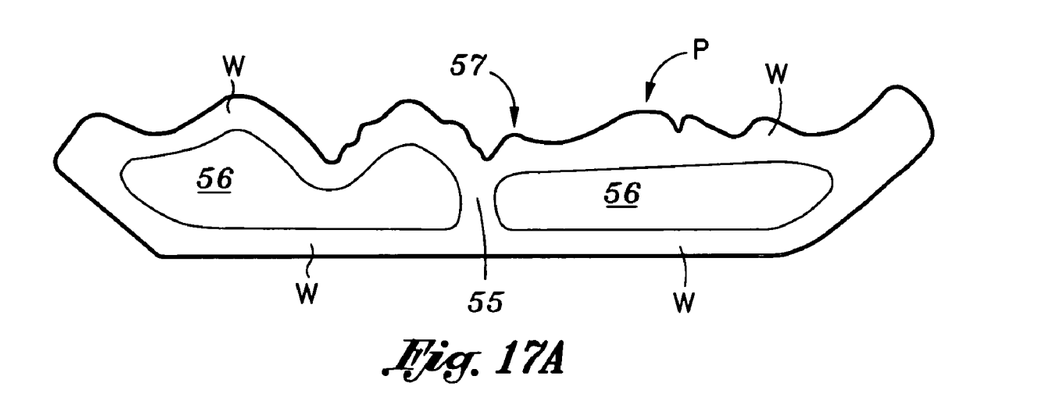
FIGS. 17A, 17B and 17C show respectively different cross sections of hollow cornices suitable for mounting at about a 45° angle against the top of a room wall where it joins the ceiling.
Figure 17B:
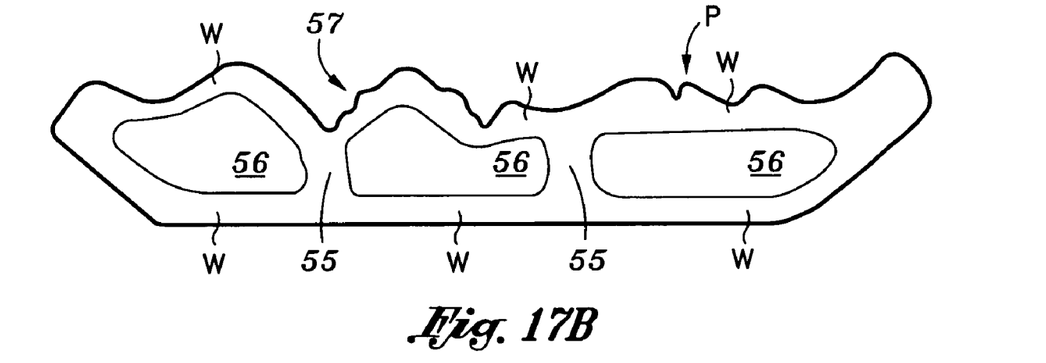
Figure 17C:
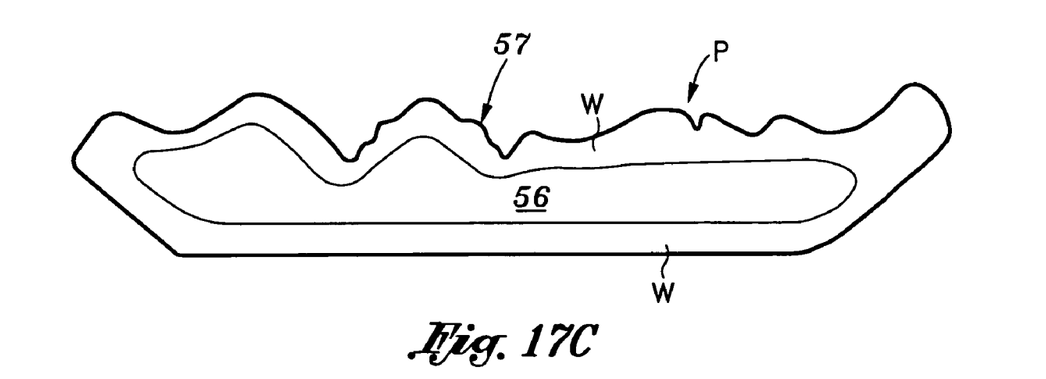
Figure 18:
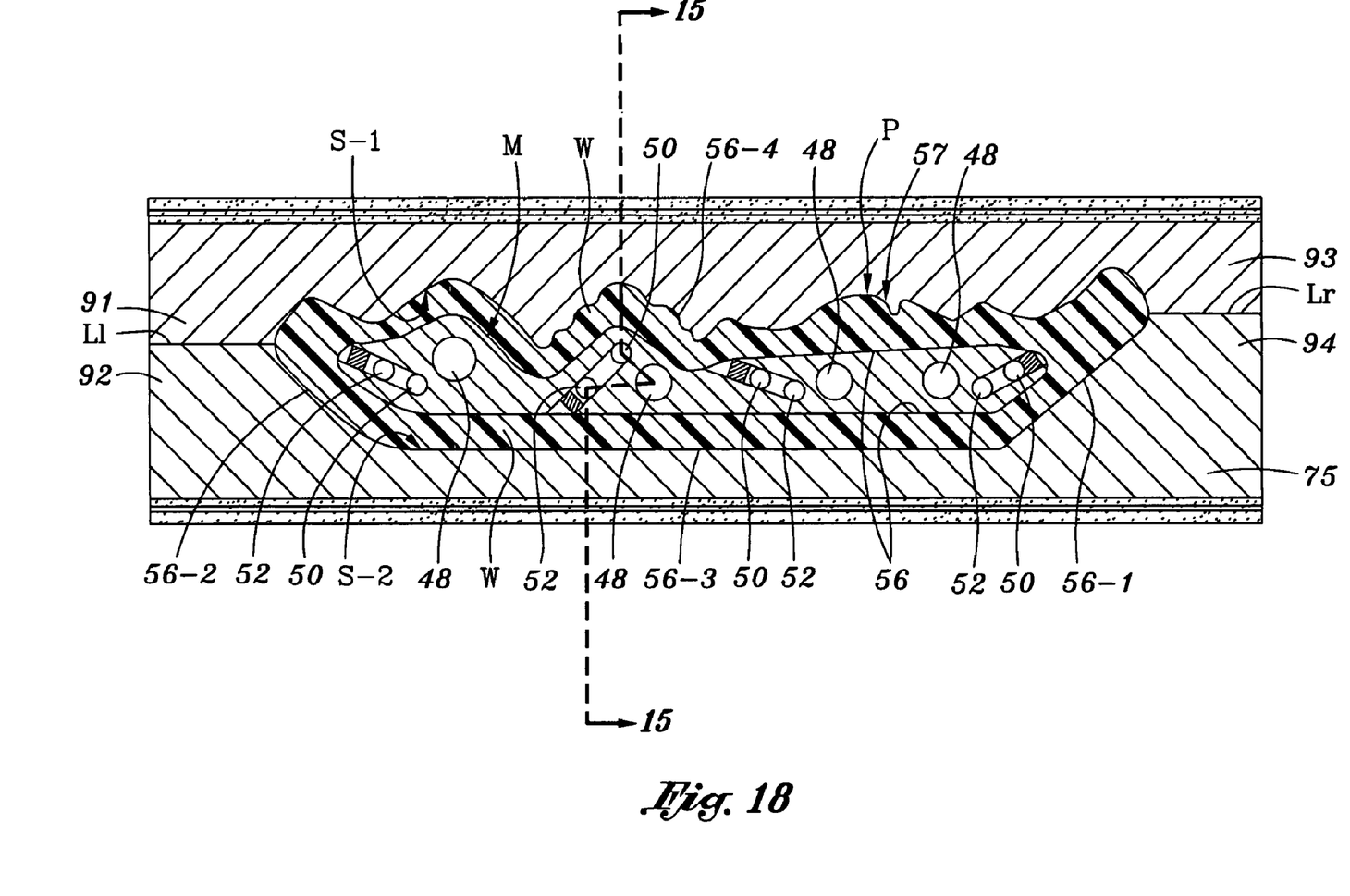
FIG. 18 is a cross section taken along line 18-18 of FIG. 15 through the mandrel and belt molds corresponding to the cornice shown in FIG. 17C.

FIGS. 15, 16, and 18 depict a second embodiment of this invention, the apparatus 200, having many of the same components as the first embodiment that function in the same or similar fashion. The main difference between the first and second embodiments is that the second embodiment employs (1) a pump P1 pumps air or other temperature-controlling fluid through the internal air passageway 48 in the mandrel M and (2) a pump P2 pumps a liquid temperature-controlling fluid 300 through a fluid feed circuit FFC that at least partially surrounds the internal air passageway 48 in the mandrel M. A more complex shaped mandrel M (FIG. 18) is also used to make the hollow cornice product P depicted in FIG. 17C, which has an open cavity 56 without any ribs 55. Alternate cornice products P with ribs 55 are depicted in FIGS. 17a and 17B. These cornice products P are suitable for mounting at about a 45° angle against the top of a room wall where it joins the ceiling.

As shown in FIGS. 15 and 18, the apparatus 200 includes the flexible, endless belt molds 75 and 76 arranged substantially as illustrated in connection with the first embodiment. The molding surfaces S-1 and S-2 respectively of the upper and lower belt molds 75 and 76 include respectively the shoulders 91 and 92, 93 and 94, which mate with each other along suitable left and right mold parting lines Ll and Lr. The surfaces S-1 and S-2 respectively correspond to the desired exterior configuration of the cornice product P depicted in FIG. 17C and the exterior shaped of the mandrel M shown in FIG. 18 corresponds to the shape of the cavity 56 of the cornice product P depicted in FIG. 17C.

In the apparatus 200, air is pumped by controllable positive-displacement pump P1 into an air in-feed passageway 48-1 leading into a transverse drilled passage 48-2 (FIG. 16)

suitably plugged at each end by plugs 86. This transverse passage 48-2 supplies the pressurized and/or cooled air into a plurality of air passages 48 (four are shown) extending downstream through the mandrel element M and discharging air through outlets 102 (only one is seen in FIG. 15) at the downstream end of the mandrel M. The function of this pressurized and/or cooled air 100 is to provide internal support and/or cooling for the hot melt 22 forming the walls W of the hollow cornice product P moving downstream between the shaped surfaces S-1 and S-2 of upper and lower belt molds 75 and 76, after leaving the mandrel M.

FIG. 15 shows the pump P2 pumping the liquid temperature-controlling fluid 300 through a valve V into the fluid feed circuit FFC. The die body 34 includes four supply passages 50-1 and four return passages 52-1 which are part of the fluid feed circuit FFC. As best depicted in FIG. 18, this fluid feed circuit FFC also includes four sets of complementary liquid supply passages 50 and return passages 52. One set including a supply passage 50 and a return passage 52 is positioned next to each of the four passageways 48 in the mandrel M to extend longitudinally along substantially the entire length of the mandrel. The liquid temperature-controlling fluid 300 is at a predetermined temperature lower than the temperature of the plastic melt 22 travelling downstream around the mandrel In order to align the four air passages 48 (FIG. 18) in mandrel M with corresponding passages 48-1 in the die body 34 and also to align liquid supply passages 50 and return passages 52 in mandrel M with corresponding passages 50-1 and 52-1 in the die body 34, the upstream end surface 66 of the mandrel M is shown suitably tapered so as to mate in wedging engagement tightly into a suitably tapered socket 68. A plurality of machine screws 70 (only one is shown in dotted outline) extend downstream through spider 46 (FIG. 16) and engage in threaded bore holes in the upstream end of the mandrel M for securing the removable mandrel end surface 66 in its socket 68.

Different assemblies of the stationary mold member N and inner mandrel M having various configurations can be mounted onto the die body 34 by detaching the retainer 60 from the lip 34-1 for removing the stationary mold member N from the die body 34, so that a differently configured stationary mold member N can be mounted onto the die body. While the stationary mold member N is removed from the die body 34, a clamp ring 36 is detached for temporarily removing the die body 34 from the nozzle 20, thereby providing access to mandrel-mounting screws 70. By removing these screws 70, the mandrel M can be withdrawn from its socket mount 68 so as to be replaced by a differently configured mandrel suitably matched in corresponding relationship with the differently configured stationary mold member N also being installed on the die body 34.

As shown in FIG. 15, the outer stationary mold member N has its downstream end surface profiled for permitting this downstream end of the stationary mold member N to fit as close as possible toward the nip region 90 between the revolving molding surfaces S-1 and S-2 of the upper and lower belt molds 75 and 76. Thus, the upper and lower surfaces 96 and 98 at the downstream end of the stationary mold member N are tapered with configurations conforming as closely as possible with respective overall maximum radial protrusions of revolving upper and lower revolving molding surfaces S-1 and S-2. For example, these surfaces 96 and 98 are sloped at an acute angle in a range of about 20° to about 60° generally about 30° relative to the downstream direction 24.

As described above, the split streams 22' of plastic melt 22, after passing the legs of spider 46, converge and flow together under pressure and become integrally welded together producing a single generally tubular stream 22" of plastic melt 22 flowing downstream in a channel 54 extending over and around mandrel M in encircling relationship around the mandrel. The mandrel M extends downstream suitably beyond the nip region 90. The mandrel M suitably extends downstream beyond plane 88 by an amount sufficient to shape and cool the interior surface of product walls W as the thermoplastic material continues to cool down through and below its glass transition temperature. For example, this downstream extension of mandrel M beyond plane 88 is in a range of about 6 to about 24 inches.

A Third Embodiment

Figure 19:
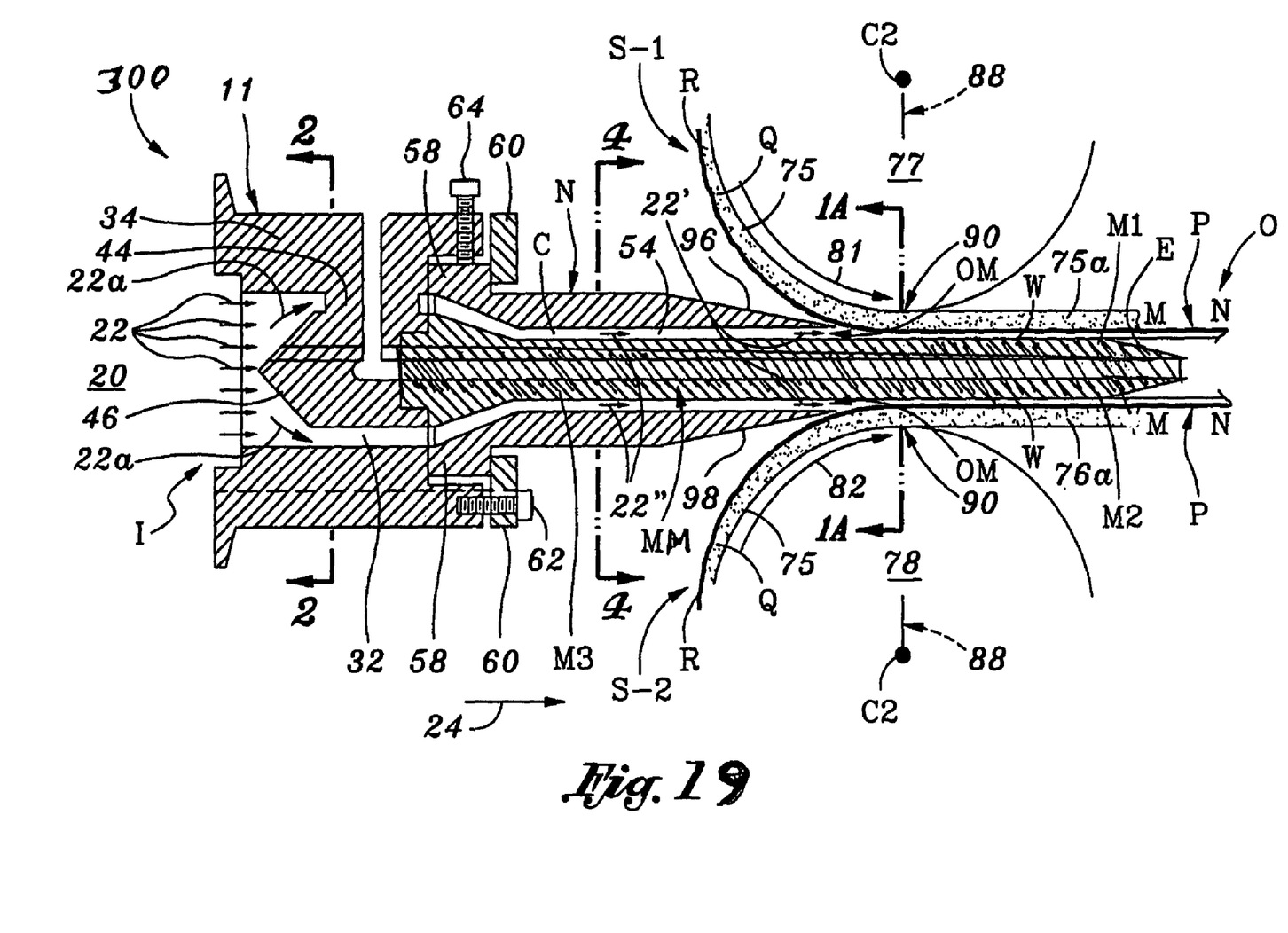
FIG. 19 is a longitudinal cross-sectional view of another embodiment of apparatus of the invention employing a solid mandrel.

FIG. 19 depicts a third embodiment of this invention, the molding apparatus 300, having essentially the same components as the first embodiment that function in the same or similar fashion, except a solid mandrel MM is employed.

As with the other embodiments, the apparatus 300 forms a hollow product P having an external wall with a predetermined cross-sectional configuration and one or more external surfaces with a variable configuration and a hollow interior section having a cross-sectional configuration. The solid, elongated mandrel MM has its proximal end M1 within the mold member N. The mold member N and mandrel MM are spaced apart to form between them the conduit C for the heated thermoplastic material. The conduit C has a cross-sectional configuration substantially the same as the cross-sectional configuration of the external wall of the product P. The cross-sectional configuration of the mandrel MM substantially corresponds to the cross-sectional configuration of the hollow interior section of the product P being formed. The exterior surface of the mandrel MM contacts and cools the heated thermoplastic material flowing into the nip region to form an internal solid skin defining the hollow interior section of the product.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiments disclosed. On the contrary, the intention is to cover all modifications and alternate constructions coming within the spirit and scope of the invention as generally expressed by the following claims, which particularly point out and distinctly claim the subject matter of the invention:

The invention claimed is:

1. A process of continuously forming from a thermoplastic material a hollow product having one or more external surfaces with a variable configuration, said process comprising:
feeding continuously said thermoplastic material at a temperature above its glass transition temperature into a nip region formed between a pair of revolving belt molds mounted opposite each other and at which said material in the nip region is subjected to an elevated pressure in excess of 15,000 pounds per square inch,
said thermoplastic material being fed through an open mouth of a mold member and said open mouth being contoured to match closely an overall general shape of the exterior of the product and positioned upstream and adjacent to the nip region, said nip region having a portion of an elongated mandrel element extending into and through the nip region with the thermoplastic material flowing from the open mouth into the nip region over and around the mandrel element as a single, generally tubular stream of melted thermoplastic material, said mandrel element having an exterior surface and said revolving belt molds having exterior surfaces, at least one of said exterior mold surfaces corresponding to the external surface on the hollow product with said variable configuration, maintaining said belt molds and mandrel element surfaces at a temperature below the glass transition temperature of the thermoplastic material, and contacting the said surfaces of said material in said nip region (i) to reduce to a temperature within or below the material's memory retention temperature range the material contacting said mold surfaces to form a solid skin on the external surfaces of the product, said variable surface configuration being formed in the skin on at least one external surface of the hollow product, and (ii) to reduce to a temperature within or below the material's memory retention temperature range the material contacting the mandrel element surface to form a solid skin defining a hollow interior section of the product, said skins enabling the product to be self-supporting.

2. A process of continuously forming from a thermoplastic material a hollow product having one or more external surfaces with a variable configuration, said process comprising:

feeding continuously said thermoplastic material at a temperature above its glass transition temperature into a nip region formed between a pair of revolving belt molds mounted opposite each other and at which said material in the nip region is subjected to an elevated pressure in excess of 15,000 pounds per square inch, said nip region having a portion of an elongated mandrel element extending into and through the nip region, said mandrel element having an exterior surface and said revolving belt molds having exterior surfaces, at least one of said exterior mold surfaces corresponding to the external surface on the hollow product with said variable configuration, maintaining said belt molds and mandrel element surfaces at a temperature below the glass transition temperature of the thermoplastic material, and contacting the said surfaces of said material in said nip region (i) to reduce to a temperature within or below the material's memory retention temperature range the material contacting said mold surfaces to form a solid skin on the external surfaces of the product, said variable surface configuration being formed in the skin on at least one external surface of the hollow product, and (ii) to reduce to a temperature within or below the material's memory retention temperature range the material contacting the mandrel element surface to form a solid skin defining a hollow interior section of the product, said skins enabling the product to be self-supporting.

3. A process of continuously forming from a thermoplastic material a hollow product having one or more external surfaces with a variable configuration, said process comprising:

feeding continuously said thermoplastic material at a temperature above its glass transition temperature into a nip region formed between a pair of revolving belt molds mounted opposite each other and at which said material in the nip region is subjected to an elevated pressure in excess of 15,000 pounds per square inch, said nip region having a portion of an elongated mandrel element extending into and through the nip region, said mandrel element having an exterior surface and said revolving belt molds each having exterior surfaces, at least one of said exterior mold surfaces corresponding to the external surface on the hollow product with said variable configuration, and maintaining said belt molds and mandrel element surfaces and the heated thermoplastic material in the nip region at a differential in temperature that is sufficiently great so that said material solidifies adequately to form an external solid skin that enables the product to be self supporting.

* * * * *